US012619102B2

(12) United States Patent
Roussel et al.

(10) Patent No.: US 12,619,102 B2
(45) Date of Patent: May 5, 2026

(54) OPHTHALMIC LENS

(71) Applicant: Essilor International,
Charenton-le-pont (FR)

(72) Inventors: Olivier Roussel, Charenton-le-pont
(FR); Carlos Rego, Charenton-le-pont
(FR); Alain Goulet, Charenton-le-pont
(FR); Mélanie Heslouis,
Charenton-le-pont (FR)

(73) Assignee: Essilor International,
Charenton-le-pont (FR)

( * ) Notice: Subject to any disclaimer, the term of this
patent is extended or adjusted under 35
U.S.C. 154(b) by 312 days.

(21) Appl. No.: 18/253,328

(22) PCT Filed: Nov. 22, 2021

(86) PCT No.: PCT/EP2021/082550
§ 371 (c)(1),
(2) Date: May 17, 2023

(87) PCT Pub. No.: WO2022/106701
PCT Pub. Date: May 27, 2022

(65) Prior Publication Data
US 2023/0408844 A1 Dec. 21, 2023

(30) Foreign Application Priority Data

Nov. 20, 2020 (EP) .................................... 20306414

(51) Int. Cl.
G02C 7/02 (2006.01)
G02C 7/06 (2006.01)

(52) U.S. Cl.
CPC ............. G02C 7/028 (2013.01); G02C 7/027
(2013.01); G02C 7/066 (2013.01)

(58) Field of Classification Search
CPC ........ G02C 7/028; G02C 7/027; G02C 7/066;
G02C 7/063
See application file for complete search history.

(56) References Cited

U.S. PATENT DOCUMENTS 7,207,675 B1 4/2007 Chauveau et al.
7,364,292 B2 4/2008 Kato
(Continued)

FOREIGN PATENT DOCUMENTS

CN 1831582 A 9/2006
CN 107077008 A 8/2017
(Continued)

OTHER PUBLICATIONS

Office Action issued Dec. 17, 2024, in corresponding Korean Patent
Application No. 10-2023-7017283 (with English Translation), 11
pages.
(Continued)

*Primary Examiner* — Tuyen Tra
(74) *Attorney, Agent, or Firm* — Oblon, McClelland,
Maier & Neustadt, L.L.P.

(57) ABSTRACT
A method for determining a progression length of an oph-
thalmic lens, the method including providing an addition
value Add, providing a model, the model linking an addition
value Add with a progression length, and based on the model
and on the provided addition value, determining the pro-
gression length.

15 Claims, 6 Drawing Sheets

(56) References Cited

U.S. PATENT DOCUMENTS

| | | | | |
|---|---|---|---|---|
| 8,333,471 B2 * | 12/2012 | Drobe | .................... | G02C 7/063 |
| | | | | 351/159.75 |
| 2006/0203193 A1 | 9/2006 | Kato | | |
| 2011/0176102 A1 | 7/2011 | Drobe et al. | | |
| 2015/0146164 A1 | 5/2015 | Contet et al. | | |
| 2017/0108710 A1 | 4/2017 | Guilloux et al. | | |

FOREIGN PATENT DOCUMENTS

| | | | |
|---|---|---|---|
| FR | 2 928 744 A1 | 9/2009 |
| JP | 54-85743 A | 7/1979 |
| JP | 5140768 B1 | 2/2013 |
| WO | WO 2014/001494 A1 | 1/2014 |
| WO | WO 2015/173379 A1 | 11/2015 |

OTHER PUBLICATIONS

International Search Report issued on Mar. 4, 2022 in PCT/EP2021/082550 filed on Nov. 22, 2021, 4 pages.
Office Action issued Mar. 15, 2024, in corresponding Australian Patent Application No. 2021382388, 3 pages.
Office Action issued Oct. 24, 2025 in Indian Patent Application No. 202317026710, citing Document 1 therein.

* cited by examiner

OPHTHALMIC LENS

FIELD OF THE DISCLOSURE

The disclosure relates to a method implemented by computer means for determining a progression length of an ophthalmic lens intended to be worn in front of an eye of an user. The disclosure also relates to a method implemented by computer means for providing ophthalmic lens surface data intended to be used for manufacturing an ophthalmic lens. Additionally, the disclosure relates to an optical element associated.

BACKGROUND OF THE DISCLOSURE

Wearers with low addition values are often new progressive lenses wearers. These new progressive lens wearers are not used to lower their gaze direction for near vision tasks. Thus, they need easy access to the near vision zone while keeping a comfortable and large vision in the near vision region.

Usually, a person needing to wear spectacles and having thus a prescription filled by an ophthalmologist or optometrist goes to the shop of an optician. The optician orders a pair of optical lenses corresponding to the prescription of the wearer. The pair of optical lenses sent to the optician are designed and manufactured according to optical criteria. In the case of progressive lenses, the pair of optical lenses are designed by determining the position and extent of the far vision region and the position and extent of the near vision region. In particular, for these new progressive lenses wearers, the position of the near vision region is important.

The choice of a frame places certain constraints on the determination of the location of the near vision zone.

Customarily, the choice of the location of the near vision zone is made by the optician on the basis of subjective criteria such as the fitting height, posture of the wearer or feedback given by the latter on his preceding piece of equipment.

The choice of the location of the near vision zone may be also obtained by measuring the near vision behavior to perfectly adapt this location to the wearer. This measurement is made by the optician. However this measurement "costs" time to the optician in shop with the wearer but also for the mandatory training to be allowed to realize this measurement.

Thus there is a need to provide a progressive lens having easy access to the near vision zone and higher visual comfort that requires less subjective choice and time consuming measurement from the optician.

SUMMARY OF THE DISCLOSURE

To this end, the disclosure proposes a method implemented by computer means for determining a progression length of an ophthalmic lens intended to be worn in front of an eye of an user, comprising the following steps:
  providing an addition value Add,
  providing a model, the model linking an addition value Add with a progression length,
  based on the model and on the provided addition value, determining the progression length.
  The ophthalmic lens is a progressive ophthalmic lens,
  The ophthalmic lens has two surfaces, a front surface and a back surface. At least one surface of the ophthalmic lens comprises at least, a far vision region having a far vision reference point FVP,
  a near vision region having a near vision reference point NVP,
  a main meridian of progression passing through the at least far vision reference point FVP and near vision reference point NVP, a portion on the meridian passing through the far vision region defining a vertical axis,
  a fitting cross FC,
  a prism reference point being an origin of a reference frame with a y-axis, the reference frame making it possible to define for each point on the lens a value on the y-axis relative to the vertical axis,
  a progression length LP corresponding to a difference between a value on the y-axis of the fitting cross FC and a value on the y-axis of the near vision reference point NVP,
  The ophthalmic lens also has a first mean power value P1 at the far vision reference point FVP and a second mean power value P2 at the near vision reference point NVP. The ophthalmic lens comprises an addition value Add corresponding to the difference between the first mean power value P1 and the second mean power value P2.

The provided addition value and the progression length LP may be associated to the ophthalmic lens.

The eye of the user may be the right eye of the user or the left eye of the user or the virtual right eye of the user or the virtual left eye of the user or the cyclopean eye of the user.

In the sense of the invention, "virtual eyes" means a numerical representation of the eyes of the user. It could be for example a point with three coordinates such as the rotation center of eyes. It could be for example a point with three coordinates such as the rotation center of eyes, optionally with a prescription.

In the sense of the invention, the cyclopean eye of the user is a virtual eye of the user used as a reference of the binocular visual system, which is positioned by default in the middle of the centers of rotation of both eyes, but which can be positioned elsewhere on the segment connecting the centers of rotation of the both eyes, for example depending on the visual dominance.

According to further embodiments, which can be considered alone or in combination, the ophthalmic lens may be a real ophthalmic lens or a virtual ophthalmic lens intended to be worn in front of a virtual eye of an user.

In the sense of the invention, "virtual ophthalmic lens" means a numerical representation of an ophthalmic lens (in space and/or in optical/surfacic power).

Advantageously, by determining the progression thanks to the addition, the method of the present disclosure, allows avoiding an additional measurement by the optician. Indeed, the inventors have shown that, without individual measurement by the optician, the addition is one of the most relevant parameters available to estimate wearer adaptation to progressive lenses and that there is a correlation between the addition and the progression length. Furthermore, using user addition is very effective for providing a good compromise between the near vision access (in other words, the shorter the progression length, the easier is the access to near vision) and the optical distortions linked to the progression of power (in other words, the higher the PL is, the lower the distortions are): low addition will allow to have lower progression length since it will create good near vision access with acceptable distortions.

According to further embodiments, which can be considered alone or in combination, the progression length (LP) is a virtual progression length of a virtual ophthalmic lens.

According to further embodiments, which can be considered alone or in combination, the model comprises a first sub model and a second sub model, and the step of determining the progression length comprises:

providing the first sub model, the first sub model linking an addition value Add with a lowering gaze angle, based on the first sub model and on the provided addition value, determining the lowering gaze angle, providing the second sub model, the second sub model linking a lowering gaze angle with a progression length, determining the progression length (LP) based on the second sub model and the lowering gaze angle. The concept of "gaze lowering angle" are known to a person skilled in the art and in particular explained in patent document WO 2015/074777 A1, to which reference is made.

According to further embodiments, which can be considered alone or in combination, the eye is a cyclopean eye. In this embodiment, the ophthalmic lens wear in front of the cyclopean eye of the user is a virtual ophthalmic lens.

Advantageously, this embodiment allows providing a common reference between the both eyes, and may improve binocular performances of a pair of ophthalmic lenses by taking account the cyclopean eye.

According to further embodiments, which can be considered alone or in combination, based on the model, the progression length PL increases with the addition value. Advantageously, the transition between the far vision region and the near vision regions keeps comfortable even if the addition value is higher.

According to further embodiments, which can be considered alone or in combination, the model is based on a prescription of an user or on a statistical database.

According to further embodiments, which can be considered alone or in combination, the model is linear and limited to a maximal and minimal progression length PL. For example, the variation can be linear between a minimal progression length 14 mm and for a maximal progression length 18 mm, such as an addition value 0.75 D for a minimal progression length 14 mm and an addition value of 2.5 D for a maximal progression length 18 mm.

According to further embodiments, which can be considered alone or in combination, the addition value is obtained from at least one of the following parameter:

a prescribed addition of the user, a prescribed mean power of the user for far vision, a prescribed mean power of the user for near vision and a prescribed mean power of the user for far vision, the age of the user, a prescribed mean power of the user for far vision and the age of the user, avoiding an additional measurement by the optician.

The disclosure further relates to a method by computer means for providing ophthalmic lens surface data intended to be used for manufacturing an ophthalmic lens, comprising the following steps determining a progression length PL of an ophthalmic lens according to the present description, providing ophthalmic lens surface data by taking into account the determined progression length.

According to an embodiment of the method by computer means for providing ophthalmic lens surface data, the progression length is a virtual progression length of a virtual ophthalmic lens. The virtual ophthalmic lens may be a target virtual lens.

In combination with the precedent method, the step of providing ophthalmic lens surface data by taking into account the determined progression length PL comprises the following steps:

providing a surface data S, providing a modified surface data S' by modifying the surface data S in order to change at least the value on the y-axis of the near vision reference point NVP such that the distance between the value of the y-axis of the fitting cross FC and the value on the y-axis of the near vision reference point NVP corresponds to the determined progression length, and the mean sphere and the cylinder at the far vision reference point FVP of the modified surface data S' and the mean sphere and the cylinder at the near vision reference point NVP of the modified surface data S' have respectively a maximal difference of 0.05D with the mean sphere and the cylinder at the far vision reference point FVP of the surface data S and the mean sphere and the cylinder at the near vision reference point NVP of the surface data S, providing ophthalmic lens surface data from the modified surface data S'.

In combination with the precedent embodiments, the method may comprise the step of providing a surface data S comprises the following steps:

providing 42 an initial surface data Sini associated with a first coordinate system, said initial surface data Sini comprising a plurality of surface points PI, each surface point PI having a mean sphere Sph(PI) and a cylinder Cyl(PI), selecting 45 n modifying surface data $S\ mod_1, \ldots S\ mod_i, \ldots, S\ mod_n$, n, i being integers with n≥1 and with 1≤i≤n said modifying surface data $S\ mod_1, \ldots S\ mod_i, \ldots S\ mod_n$ being associated with a second coordinate system, with n being a nonzero integer;

positioning the n modifying surface data $S\ mod_1, \ldots, S\ mod_i, \ldots, S\ mod_n$ (46), during which the relative position and/or the relative orientation of the first coordinate system with respect to the second coordinate system is determined and during which the n modifying surface data S mod expressed in the first coordinate system are $S'\ mod\ 1, \ldots, S'\ mod\ i, \ldots S'\ mod\ n$, combining 47 the n modifying surface data such that the surface data S is determined by:

$$S = Sini + \sum_{i=1}^{n} \text{alpha}_i \cdot S'\text{mod}_i$$

$\text{alpha}_i$ being a nonzero weighting coefficient.

By positioning, we mean rotating and/or translating the modifying surface data.

Advantageously, by using modifying surface data as described above, it is possible to modify easily and locally the position and/or extent of a region of the ophthalmic lens. The region may be a near vision region and/or far vision region and/or intermediate vision region. Thus, for example, it allows a higher visual comfort to be obtained by, in the same time, making easier the access of the near vision region and keeping a comfortable size of the near vision region.

Alternatively or in combination with the precedent method, the step of providing a surface data S comprises the following steps:

providing 42 an initial surface data Sini associated with a first coordinate system, said initial surface data Sini comprising a plurality of surface points PI, each surface point PI having a mean sphere Sph(PI) and a cylinder Cyl(PI), selecting n modifying surface data S mod$_1$, . . . S mod$_i$, . . . , S mod$_n$, n, i being integer with n≥1 and with 1≤i≤n said modifying surface data S mod$_1$, . . . S mod$_i$, . . . S mod$_n$ being associated with the first coordinate system, with n being a nonzero integer;

combining the n modifying surface data such as the surface data S is determined by:

$$S = Sini + \sum_{i=1}^{n} alpha_i \cdot S mod_i$$

alpha$_i$ being a nonzero weighting coefficient.

Advantageously, by using modifying surface data as described above with the same coordinate system as the coordinate system of the initial surface data, it is possible to modify easily and globally the position and extent of the far vision region and/or the position and extent of the near vision region.

Alternatively or in combination with the precedent method, the step of the n weighting coefficient alpha are calculated based on at least one of the following parameter:

Prescribed mean power

Prescribed astigmatism

Prescribed addition,

Addition from the age of the user.

avoiding an additional measurement by the optician.

Alternatively or in combination with the precedent method, the modifying surface data are selected to enlarge the near vision in order to enhance the near vision zone accessibility for new progressive lenses wearer and enlarging the near vision zone.

Advantageously, according to this embodiment, a progressive lens may be provided with high visual comfort to the wearer, in particular providing large near vision field of view and easy access to the near vision zone (no need to lower too much eye gaze direction so as to be close to ergonomic posture), while at the same time providing a limited level of distortions caused by the progressive lens design (gradient of resulting astigmatism in particular).

Alternatively or in combination with the precedent method, the modifying surface data are selected to enlarge the far vision region.

Another aspect of the disclosure relates to an ophthalmic lens calculating device adapted to implement a method as described in the present disclosure.

Another aspect of the disclosure relates to ophthalmic element comprising:

the ophthalmic lens having at least a far vision region having a far vision reference point FVP, a near vision region having a near vision reference point NVP, a main meridian of progression passing through the at least far vision reference point FVP and near vision reference point NVP, a portion on the meridian passing through the far vision region defining a vertical axis, a fitting cross FC, a prism reference point being an origin of a reference frame with a vertical y-axis, the reference frame making it possible to define for each point on the lens a value on the y-axis, a progression length PL corresponding to a difference between a value on the y-axis of the fitting cross FC and a value on the y-axis of the near vision reference point NVP, the ophthalmic lens having a first mean power value P1 at the far vision reference point FVP and a second mean power value P2 at the near vision reference point NVP, the ophthalmic lens comprising an addition value Add corresponding to the difference between the first mean power value P1 and the second mean power value P2, the near vision region having, at the near vision reference point NVP, a resulting astigmatism width evaluated for a resulting astigmatism value lower than 0.5 D added to the astigmatism value at the near vision reference point NVP, wherein the resulting astigmatism width corresponds to the higher width between a first width W1 and a second width W2, the first width W1 and the second width W2 being defined respectively as:

$$W1 = \frac{LP}{Add} \times a - b * P1 + c$$

$$W2 = d \times a\tan(e \times (Add - f)) + g$$

Where $1 < a < 2, 0.2 < b < 0.4, 11 < c < 12,$ $3 < d < 4, 4 < e < 6, 1 < f < 2$ and $18 < g < 22.$ The resulting astigmatism width at the near vision reference point NVP is defined by where the resulting astigmatism value is lower than 0.5 D added to the astigmatism value at the near vision reference point NVP. The resulting astigmatism width may be expressed in degrees.

BRIEF DESCRIPTION OF THE DRAWINGS

Embodiments of the invention will now be described, by way of example only, and with reference to the following drawings in which:

FIG. 1 illustrates the definition of certain parameters of a progressive ophthalmic lens, in particular FIG. 1 comprises.

Figures 1A, 1B:
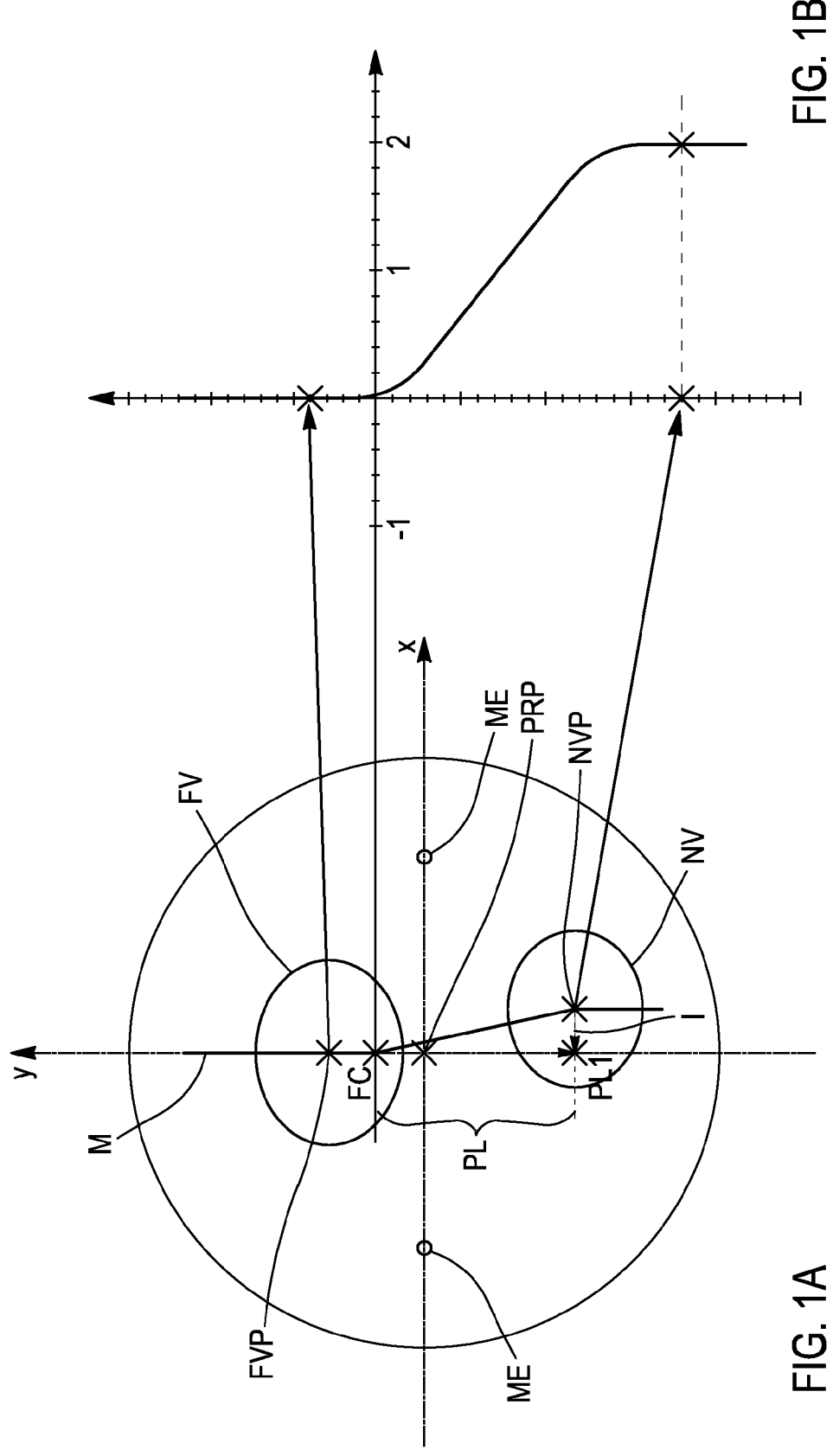
FIG. 1A schematically showing a progressive ophthalmic lens and FIG. 1B illustrating the power progression profile along the meridian of the progressive lens

Elements in the figures are illustrated for simplicity and clarity and have not necessarily been drawn to scale. For example, the dimensions of some of the elements in the figure may be exaggerated relative to other elements to help to improve the understanding of the embodiments of the present disclosure.

DETAILED DESCRIPTION OF EMBODIMENTS OF THE DISCLOSURE

In the remainder of the description, reference is made to terms such as "top", "bottom", "horizontal", "vertical", "above", "below" or other words indicating relative positions. It will be understood that these terms should be understood under the wearing conditions of the lens and they are to take reference with respect to the prism reference point $P_{PRP}$ when dealing with a surface or with respect to the fitting cross in the case of the lens. The prism reference point $P_{PRP}$ and the fitting cross are defined below.

In the context of the present invention the term "ophthalmic lens" refers to a progressive ophthalmic lens, and can refer to a lens, a finished lens, an uncut lens, a semi-finished lens, or a spectacle lens adapted for a wearer. The expression "progressive lens" (or "progressive eyeglass") is understood to mean an ophthalmic lens with a progressive power variation for visual-correction spectacles.

The eye of the user may be the right eye of the user or the left eye of the user or the virtual right eye of the user or the virtual left eye of the user or the cyclopean eye of the user.

In the sense of the invention, "virtual eyes" means a numerical representation of the eyes of the user. It could be for example a point with three coordinates such as the rotation center of eyes, optionally with a prescription.

In the sense of the invention, the cyclopean eye of the user is a virtual eye of the user used as a reference of the binocular visual system, which is positioned by default in the middle of the centers of rotation of both eyes, but which can be positioned elsewhere on the segment connecting the centers of rotation of the both eyes, for example depending on the visual dominance.

According to further embodiments, which can be considered alone or in combination, the ophthalmic lens may be a real ophthalmic lens or a virtual ophthalmic lens intended to be worn in front of a virtual eye of an user. In the sense of the invention, "virtual ophthalmic lens" means a numerical representation of an ophthalmic lens (in space and/or in optical/surfacic power).

"Prescription value" or "Prescription" is known in the art. It refers to one or more data obtained for the wearer and indicating for each eye a prescribed far vision power, and/or a prescribed astigmatism value and/or a prescribed astigmatism axis and/or a prescribed addition value suitable for correcting the ametropia and/or the presbyopia of each eye. The mean power for far vision, PFV, is obtained by summing the half value of the prescribed astigmatism value to the prescribed far vision mean power value. Then, the mean power of each eye for near vision, PNV, is obtained by summing the prescribed addition value A to the far vision mean power prescribed for the same eye: PNV=PFV+A. In the case of a prescription for progressive lenses, prescription data comprise wearer data indicating at least for each eye values for far vision prescribed power and prescribed addition value.

Surface quantities are expressed relative to points. The points are located in a reference frame whose origin is usually the prism reference point PRP. Each point of the surface of a lens, (front surface or back surface) is associated with a mean sphere and a cylinder which depend on the refractive indice of the lens. The manufacturer of the lens is requested to indicate the location of the prism reference point PRP so that any optician can measure the values of prism for the lens. For progressive lenses, the prism reference point usually corresponds to the middle of the micro-engravings on the lens. The manufacturer of the lens is also required to mark such micro-engravings in this situation.

FIG. 1A on the left schematically shows a progressive ophthalmic lens. The expression "progressive lens" (or "progressive eyeglass") is understood to mean an ophthalmic lens with a progressive power variation for visual-correction spectacles. The progressive lens includes, in its upper portion, a far vision region FV the power of which is suitable for the far vision of the wearer depending on his visual-correction needs and, in its lower portion, a near vision region NV the power of which is suitable for the near vision of this wearer. As usually and shown on the FIG. 1, the prism reference point PRP is the origin of the reference frame with the x-axis being a horizontal axis parallel to the micro-engravings ME, the y-axis being vertical and perpendicular to the x-axis and the z-axis (not shown) being normal to the front surface at the prism reference point PRP. The reference frame makes it possible to define each of the points on the lens.

Standard ISO 13666:2012 defines certain parameters used for the fitting of a progressive lens. Thus, the reference point FVP is a far vision point defined by the manufacturer, for example at the center of a circle delimiting the far vision region. Likewise, the reference point NVP is a near-vision point defined by the manufacturer, for example at the center of a circle delimiting the near vision region. The fitting cross FC is a point located on the front surface of an eyeglass or a semi-finished eyeglass, that the manufacturer considers to be a reference point for the positioning of the eyeglass in front of the eye. The fitting cross FC is in general marked by an erasable marking that is removed after fitting.

A progression length PL is defined as the vertical distance between the fitting cross and the near vision reference point NVP and is usually expressed in mm.

Moreover, the internal offset I (or inset) of the lens is defined as the horizontal offset between the far vision reference point FVP and the near vision reference point NVP.

The optical power of the lens varies, preferably continuously, between said far vision reference point FVP and said near vision reference point NVP, along a line called the meridian line M, which passes through these two points. This meridian line passes through at least the far vision region and the near vision region in an overall vertical direction.

An addition is defined as being the difference between the mean power at the far vision reference point and the mean power at the near vision reference point and is usually expressed in diopter. The mean power at the far vision reference point and the mean power at the near vision reference point may be obtained from a measurement on the wearer/a prescription or may be obtained from a measurement on a lens at respectively the far vision reference point FVP and the near vision reference point NVP using for example a focimeter. The mean power at near vision reference point may be also obtained not from a measurement but from a fixed value according to the type of user, for example from a consideration of the age of an user.

FIG. 1B shows a graph which illustrates an example of a power progression profile along the meridian of a progressive lens. The X-axis of the graph is the addition in Diopter and the Y-axis of the graph is the coordinate in mm along the meridian. At 8 mm, the far vision reference point FVP is illustrated with an addition value of 0 and at −14 mm, the near vision reference point NVP is illustrated with an addition value of 2 D.

Figure 2:
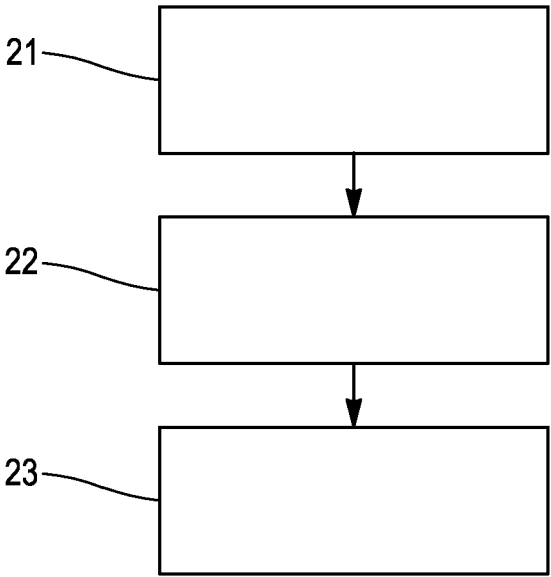
FIG. 2 illustrates a flow chart embodiment of the method for determining a progression length of an ophthalmic element according to an embodiment of the present disclosure.

FIG. 2 illustrates a flow chart embodiment of the method for determining a progression length of an ophthalmic element according to an embodiment of the present disclosure. As explained before, the ophthalmic lens may have a first mean power value P1 at the far vision reference point (FVP) and a second mean power value P2 at the near vision reference point (NVP). The method according to the present disclosure may comprise the following steps:

> providing an addition value Add (21),
> providing a model (22), the model linking an addition value Add with a progression length (LP),
> based on the model and on the provided addition value, determining the progression length (23).

According to one preferred embodiment, the progression length PL may be increased with the addition value. In this case, advantageously, the transition between the far vision region and the near vision regions keeps comfortable even if the addition value is higher.

The addition value may be provided from the prescription in particular, the prescribed addition or the prescribed far vision mean power and/or prescribed near vision mean power. Alternatively or in combination, the addition value may be estimated from the age of the user. Alternatively or in combination, the addition value may be estimated from the age of the user and from the far vision reference point FVP. The link between the addition value and the age of the user may be obtained statistically by collecting data on many users or may be obtained theoretically for example as explained in the article Anderson et al Minus-Lens-Stimulated Accommodative Amplitude Decreases Sigmoidally with Age: A Study of Objectively Measured Accommodative Amplitudes from Age 3, 2008, Invest Ophthalmol Vis Sci. 2008 July; 49(7): 2919-2926.

The model may be limited to a maximal and minimal progression length LP, for example between 7 to 22 mm, 12 mm to 20 mm preferably 14 mm-18 mm.

The model may use different kinds of relation between the addition value and the progression length, for instance using linear variations, parabolic variations or exponential variations.

The model may be dependent on the prescription. For example, the model may be different according to the type of ametropia and/or presbyopia of each eye of the wearer.

The model may be dependent on addition, sphere (mean sphere or binocular mean sphere) or cylinder, or age of the user.

The model may be linked an addition value Add of an ophthalmic lens with a progression length (LP) of the ophthalmic lens. The model may be linked an addition value Add of an ophthalmic lens with a progression length (LP) of the same ophthalmic lens. The model may be linked an addition value Add of an ophthalmic lens with a progression length (LP) of the ophthalmic lens.

The model may be obtained from measurement on wearers, from theoretical models, from simulation of measurement on wearers, from a statistical database. The model may use machine learning such as neural networks.

The input of the model is the addition value or the addition value and the far vision prescription. If not mentioned, the addition value may be estimated from the value of the prescription, for example the prescribed far vision mean power and the prescribed near vision mean power or from the age of the wearer.

Once we provide an input for the model, we obtain an output which is the progression of length. In other words, based on the model and the provided addition value, the progression length is determined.

According to further embodiments, which can be considered alone or in combination, the progression length (LP) is a virtual progression length of a virtual ophthalmic lens.

According to further embodiments, which can be considered alone or in combination, the model comprises a first sub model and a second sub model, and the step of determining the progression length comprises:

> providing the first sub model, the first sub model linking an addition value Add with a lowering gaze angle,
> based on the first sub model and on the provided addition value, determining the lowering gaze angle,
> providing the second sub model, the second sub model linking a lowering gaze angle with a progression length,
> determining the progression length (LP) based on the second sub model and the lowering gaze angle.

The concept of "gaze lowering angle" are known to a person skilled in the art and in particular explained in patent document WO 2015/074777 A1, to which reference is made.

For example, the statistical database may be obtained from measurements of the gaze lowering angle of a population user when users read on a smartphone of a tablet, for example as described in the applications EP3361929 or EP3362845.

For example, the population may be more than 100 users, more than 1000 users, more than 10000 users, more than 100000 users, more than 200000 users.

For each user for which a measurement is made, its prescription may be associated (for example, addition and/or sphere/mean sphere/binocular mean sphere) to its measured gaze lowering angle.

From all this collected information, a first sub model between the gaze lowering angle (or mean gaze lowering angle), the sphere (or mean sphere or binocular mean sphere) and the addition may be obtained, for example > gaze lowering angle=$A$*sphere+$B$*addition+$C$ with for example: $0.1 < A < 0.2$, $0.4 < B < 0.6$ and $24 < C < 26$.

Alternatively, a first sub model between the gaze lowering angle and the addition may be. for example > gaze lowering angle=$B'$*addition+$C'$ The first sub model may linear or may be not linear.

Then from the gaze lowering angle, the progression length may be determined based on a second sub model for example as described in The second sub model may linear or may be not linear.

Figure 3:
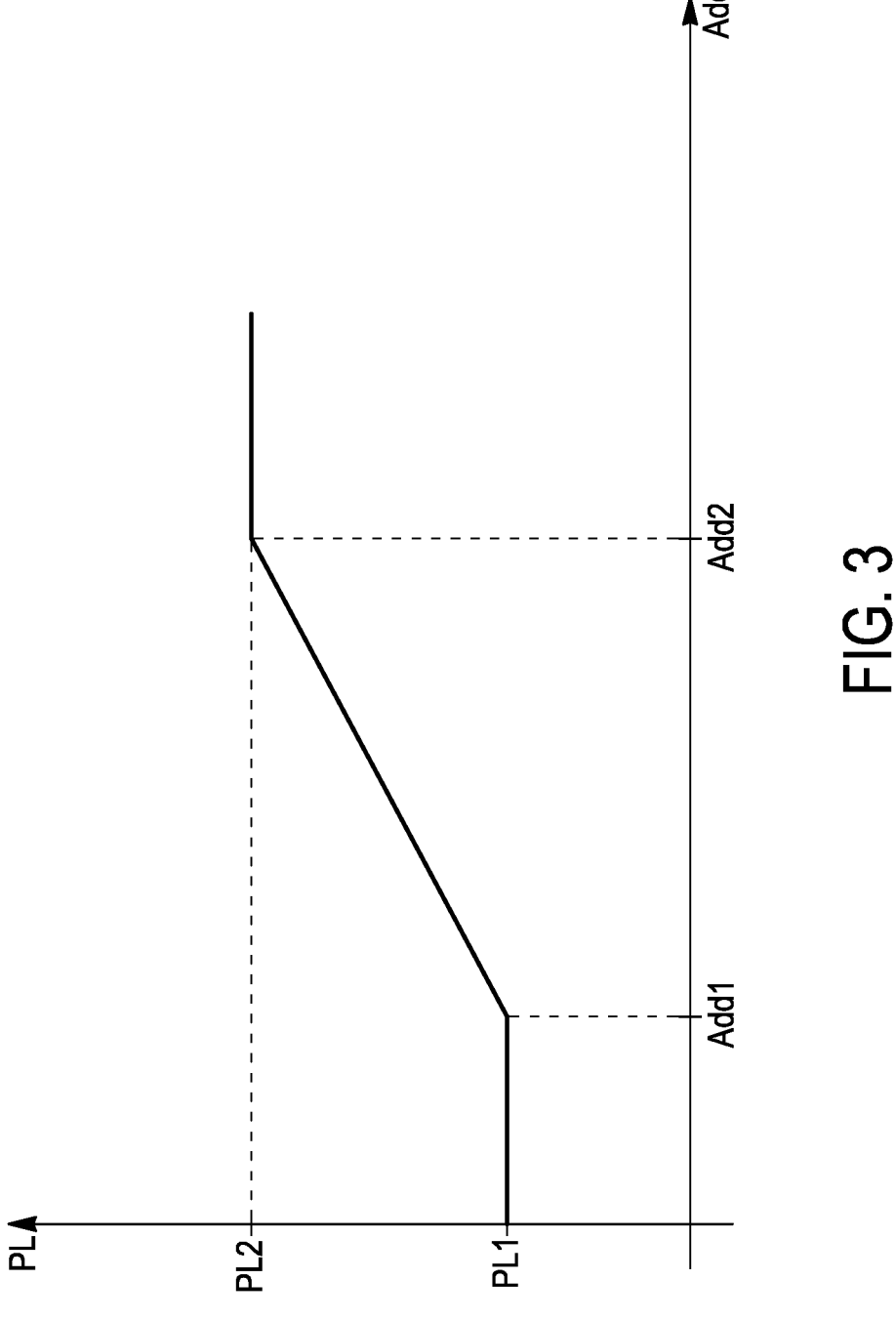
FIG. 3 illustrates a model linking an addition value with a progression length according to an embodiment of the present disclosure.

Optionally, the second sub model may comprise a modulation of the progression length by a transfer law (linear or not linear) to obtain the determined progression length. FIG. 3 illustrates a model linking an addition value with a progression length. On the figure, the model is represented with a graph having addition values Add (D) in abscissa and progression length PL (mm) in ordinate. In this example, the relation between the addition values and the progression length is linear and limited between LP1=14 mm to LP2=18 mm with respectively an addition value of Add1=0.75D and Add2=2.5D. With an addition of less than 0.75D, the model is constant and the progression length is equal to LP1 and with an addition of more than 2.5D, the model is constant and the progression length is equal to LP2.

According to further embodiments, which can be considered alone or in combination, the eye is a cyclopean eye. In this embodiment, the ophthalmic lens wear in front of the cyclopean eye of the user is a virtual ophthalmic lens. In this embodiment, if the addition is the same for the both eye, the provided Addition is the same; if the addition is different for the both eye, the provided Addition may be the mean addition between the both eye, the weighted addition between the both eye, minimal or maximal addition. Thus the length progression determined is a virtual length progression of a virtual ophthalmic lens in front of a cyclopean eyes.

Advantageously, this embodiment allows providing a common reference between the both eyes, and may improve binocular performances of a pair of ophthalmic lenses by taking account the cyclopean eye.

Figure 4:
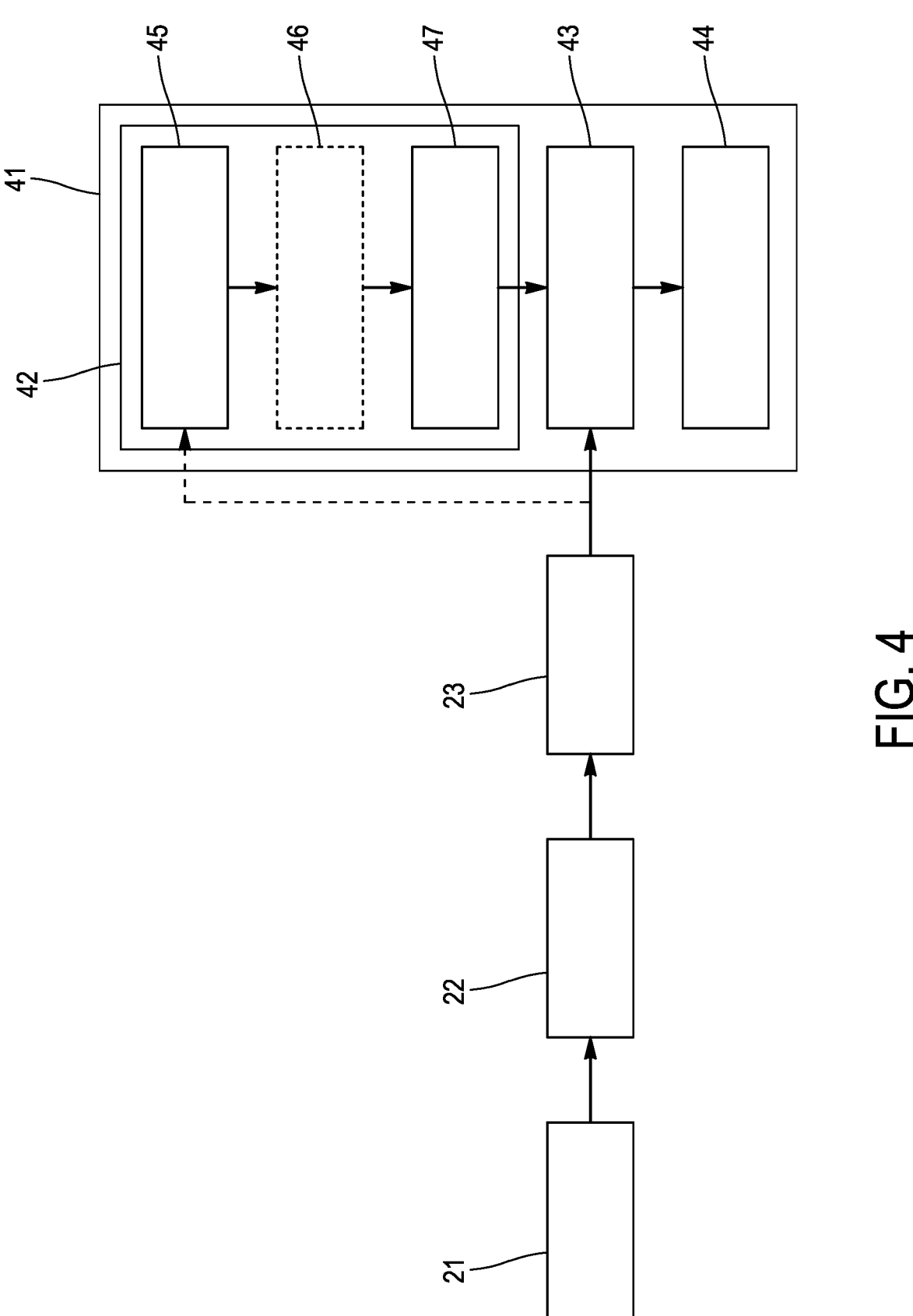
FIG. 4 illustrates a flow chart embodiment of the method for providing ophthalmic lens surface data intended to be used for manufacturing an ophthalmic lens according to an embodiment of the present disclosure.

FIG. 4 illustrates a flow chart embodiment of the method implemented by computer means for providing ophthalmic lens surface data intended to be used for manufacturing an ophthalmic lens, comprising the following steps determining a progression length PL of an ophthalmic element according to the steps described before 21, 22, 23, and providing 41 ophthalmic lens surface data by taking into account the determined progression length.

The ophthalmic lens surface data may be obtained by enforcing directly the determined progression length.

Alternatively, the ophthalmic lens surface data may be obtained indirectly by using a surface data from which the method is going to start as explained below.

Thus the step of providing 41 ophthalmic lens surface data by taking into account the determined progression length may comprise the following steps:

providing 42 a surface data S, providing a modified surface data S' by modifying 43 the surface data S in order to change at least the value on the y-axis of the near vision reference point NVP such that the distance between the value of the y-axis of the fitting cross FC and the value on the y-axis of the near vision reference point NVP corresponds to the determined progression length, and the mean sphere and the cylinder at the far vision reference point FVP of the modified surface data S' and the mean sphere and the cylinder at the near vision reference point NVP of the modified surface data S' have respectively a maximal difference of 0.05D with the mean sphere and the cylinder at the far vision reference point FVP of the surface data S and the mean sphere and the cylinder at the near vision reference point NVP of the surface data S, providing 44 ophthalmic lens surface data from the modified surface data S'.

To manufacture an ophthalmic lens, the rear face or/and the front face of the ophthalmic lens is machined according to a "virtual" lens data, named here "ophthalmic lens surface data" which is optimized so as to have both the desired design feature value, determined for the wearer according to the addition value, and the ametropic correction prescribed for him. In a known manner, such an optimization is performed digitally starting from a target virtual lens, named here "surface data" or later "initial surface data" in such a manner as to arrive at the distributions of the optical quantities, such as the optical power and the astigmatism.

Programs designed to carry out such optimizations are assumed to be known to those skilled in the art and are not described here.

According to an embodiment of the method by computer means for providing ophthalmic lens surface data, the progression length is a virtual progression length of a virtual ophthalmic lens. The virtual ophthalmic lens may be a target virtual lens. The surface data S comprises a plurality of surface points PI, each surface point PI having a mean sphere Sph(PI) and a cylinder Cyl(PI). The surface data S has a dioptric function. The origin of the first coordinate system is preferably located in the middle of the micro-engravings ME as illustrated on FIG. 1A.

According to an embodiment of the method by computer means for providing ophthalmic lens surface data, the progression length is a virtual progression length of a virtual ophthalmic lens. The virtual ophthalmic lens may be a target virtual lens.

Figure 5:
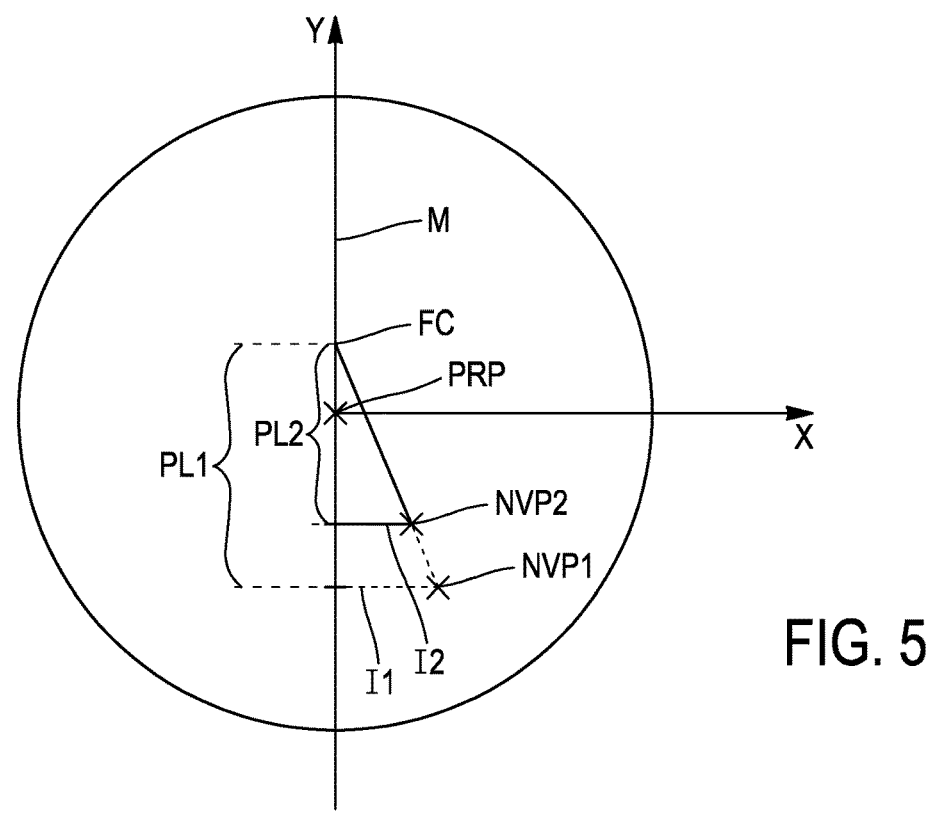
FIG. 5 illustrates a spatial map of an ophthalmic lens surface data according to an embodiment of the present disclosure.

For example, the ophthalmic lens surface data may be determined based on the method as described in the application For example, the ophthalmic lens surface data may be determined based on the method as described in the application The step of modifying 43 the surface data S is illustrated in FIG. 5. FIG. 5 shows an example of a spatial map of an ophthalmic lens surface data with a near vision reference point NVP1 and a first progression length LP1 defined as being the distance between the value on the y-axis of the fitting cross FC and the value on the y-axis of the near vision reference point NVP1. The value on the x-axis of the near vision reference point NVP1 corresponds to an inset I1. According to the steps described before 21, 22, 23, a progression length LP2 is determined and the ophthalmic lens surface data is modified in order by to change at least the value on the y-axis of the near vision reference point NVP such that the distance between the value of the y-axis of the fitting cross FC and the value on the y-axis of the modified near vision reference point NVP2 corresponds to the determined progression length LP2.

As illustrated on FIG. 5, when the progression length changes, the x and y position of the near vision reference point NVP changes and consequently the inset may change. Thus the value on the x-axis of the near vision reference point NVP2 may correspond to an inset I2.

In the step 43, the surface data S is modified also in order to change at least the value on the y-axis of the near vision reference point NVP such as the mean sphere and the cylinder at the far vision reference point FVP of the modified surface data and the mean sphere and the cylinder at the near vision reference point NVP of the modified surface data are close respectively to the mean sphere and the cylinder at the far vision reference point FVP of the surface data S and the mean sphere and the cylinder at the near vision reference point NVP of the surface data S. By "close", we mean a maximal difference of 0.05D between the mean sphere and the cylinder at the far vision reference point FVP of the modified surface data and the mean sphere and the cylinder at the near vision reference point NVP of the modified surface data with respectively the mean sphere and the cylinder at the far vision reference point FVP of the surface data S and the mean sphere and the cylinder at the near vision reference point NVP of the surface data S.

To modify the surface data in order to fill these two conditions. There are several known methods which may be used alone or in combination.

For example, to apply to the surface data a shear function as described in the application US2010079722 may be used. In this application, the principle of a shear function is understood to mean a translation of the optical properties of the lens, with respect to a fixed coordinate system that is associated with the lens, whose translation amplitude varies along a direction perpendicular to the direction of translation.

For example, to apply to the surface data a scaled function as described in the application US2010004593 may be used.

Or any other function, scaled function or shear function known by a skilled man to fill the two conditions cited above.

According to one embodiment of the present disclosure and as illustrated in FIG. 4, the method may comprise the step of providing a surface data S comprises the following steps:

> providing 45 an initial surface data Sini associated with a first coordinate system, said initial surface data Sini comprising a plurality of surface points PI, each surface point PI having a mean sphere Sph(PI) and a cylinder Cyl(PI),
>
> selecting 45 n modifying surface data S mod$_1$, . . . S mod$_i$, . . . , S mod$_n$, n, i being integers with n≥1 and with 1≤i≤n said modifying surface data S mod$_1$, . . . S mod$_i$, . . . S mod$_n$ being associated with a second coordinate system, with n being a nonzero integer;
>
> positioning 46 the n modifying surface data S mod$_1$, . . . S mod$_i$, . . . , S mod$_n$ 46, during which the relative position and/or the relative orientation of the first coordinate system with respect to the second coordinate system is determined and during which the n modifying surface data S mod expressed in the first coordinate system are S' mod 1, . . . , S' mod i, . . . S' mod n,
>
> combining 47 the n modifying surface data such that the surface data S is determined by:

$$S = Sini + \sum\nolimits_{i=1}^{n} \text{alpha}_i \cdot S' \text{mod}_i$$

alpha$_i$ being a nonzero weighting coefficient.

By positioning, we mean rotating and/or translating the modifying surface data.

Alternatively or in combination with the precedent method, the step of providing a surface data S comprises the following steps:

> providing 45 an initial surface data Sini associated with a first coordinate system, said initial surface data Sini comprising a plurality of surface points PI, each surface point PI having a mean sphere Sph(PI) and a cylinder Cyl(PI),
>
> selecting 45 n modifying surface data S mod$_1$, . . . , S mod$_i$, . . . , S mod$_n$,
>
> n, i being integer with n≥1 and with 1≤i≤n
>
> said modifying surface data S mod$_1$, . . . S mod$_i$, . . . S mod$_n$ being associated with the first coordinate system, with n being a nonzero integer;
>
> combining 47 the n modifying surface data such as the surface data S is determined by:

$$S = Sini + \sum\nolimits_{i=1}^{n} \text{alpha}_i \cdot S \text{mod}_i$$

alpha$_i$ being a nonzero weighting coefficient.

Advantageously, by using modifying surface data as described above with the same coordinate system as the coordinate system of the initial surface data, it is possible to modify easily and globally the position and extent of the far vision region and/or the position and extent of the near vision region.

During the surface data providing step 45, an initial surface Sini associated with a first coordinate system is provided. The initial surface Sini comprises a plurality of surface points PI, each surface point PI having a mean sphere Sph(PI) and a cylinder Cyl(PI). The initial surface Sini has an initial dioptric function. The origin of the first coordinate system is preferably located in the middle of the micro-engravings ME as illustrated on FIG. 1A.

Each modifying surface data S mod$_i$ may comprise a plurality of surface points Pi1, . . . Pij, . . . Pim, each surface point Pij having a mean sphere Sph(Pij) and a cylinder Cyl(Pij), n, i, j, being integers with n≥1, 1≤i≤n, 1≤j≤m and m≥1.

The selection step may be for example to provide directly the modifying surface data.

The selection step may be also for example a calculation step, in which the modifying surface data is built by optimization such that:

> Selecting at least one surfacic point or one sight direction (preferentially, a set of sight surfacic points or directions, sampling the whole field of view), Evaluating the current optical performances for each selected location (such as near vision region), including at least mean power and resulting astigmatism (as defined later), From those current optical performances, creating a set of modifying surface data by modifying the initial surface data around the selected surfacic points or directions. This modification is done by attenuating the performance gap (for example, the gap of resulting astigmatism) between the current direction/point and the direction/point at the same lowering direction/height on the optical/surfacic meridian of the ophthalmic lens.

The attenuation can be evaluated for example by defining a gaussian function having different horizontal and vertical standard deviations (sigmaX and sigmaY) such as exp(−x$^2$/ sigmaX$^2$) or by defining a trigonometric function such as atan(x), or for example a combination of different functions. Preferentially, the sigmaX can be fixed based on the initial width of a relative variation of 0.5 D of the resulting astigmatism.

The n modifying surface data S mod$_1$ . . . S mod$_i$, . . . , S mod$_n$, may be associated with the first coordinate system or with a second coordinate system.

In the case of a first and a second coordinate system, during the positioning step 46, the relative position and orientation of the first coordinate system and the second coordinate system is determined. By positioning, we mean rotating and/or translating the modifying surface data. The position and orientation may be done by positioning and orienting one of the first and second coordinate system in the other. For example the first coordinate system is positioned and oriented in the second coordinate system or vice versa. Thus, the relative position and/or the relative orientation of the first coordinate system with respect to the second coordinate system is determined and the n modifying surface data S mod expressed in the first coordinate system are S' mod 1, . . . , S' mod i, . . . S' mod n.

In the case of the same coordinate system for the modifying surface data and for the initial surface data, the positioning step may be not necessary.

During the combining step 47, the n modifying surfaces are combined to obtain a functionalized ophthalmic lens surface data according to the expression:

$$S = Sini + \sum_{i=1}^{n} \text{alpha}_i \cdot S' \text{mod}_i \text{ or } S = Sini + \sum_{i=1}^{n} \text{alpha}_i \cdot S\text{mod}_i$$

$\text{alpha}_i$ being a nonzero weighting coefficient.

Advantageously, by combining at least one of the selected modifying surface, the dioptric function of the modified initial surface is modulated according to the dioptric function of the at least one selected modifying surface.

During the positioning step 46, the combination may be linking the first and second coordinate system by a main axis along which the addition is carried out and the correspondence of at least a point of the first coordinate system with a point of the second coordinate system.

The method of the invention may further comprises a weighting coefficient determining step prior to the combining step during which the value of the weighting coefficient alpha is determined/calculated based on a wearer parameter of the ophthalmic lens, for example based on the prescription of the wearer, the prescribed mean power, the prescribed astigmatism, the prescribed addition or the addition from the age of the user. For example, the weighting coefficient alpha may be evaluated with a function of the wearer prescriptions ax Add+b with a and b being coefficients which depend on the prescription of the wearer (prescribed power, prescribed astigmatism) such as evaluated with functions or selected in segmented ranges (i.e. a predefined range of power and astigmatism is linked with given a and b values).

According to one embodiment, the modifying surface data are selected to modify one region of the ophthalmic lens.

In a preferred embodiment, the modifying surface data are selected to enlarge the near vision zone.

Moreover, in order to enhance the near vision zone accessibility for new progressive lenses wearers, the ophthalmic lens surface data may be modified to enlarge the near vision zone by decreasing the resulting (unwanted) astigmatism on each side of the near vision point. This enlargement has to preserve the power variation of the initial ophthalmic lens.

The resulting astigmatism is defined as the difference between a prescribed astigmatism and the astigmatism generated by the working lens in the reference frame associated with the eye, and for each gaze direction. Resulting astigmatism may also be called residual astigmatism.

By enlarging the near vision zone, we mean that the needed enlargement can be estimated by simulating the width of a target or a planar object, located at near task distance (for example, 40 cm) and by calculating in these conditions the resulting astigmatism value. Thus, the width where the resulting astigmatism value is lower than a given value (for example, 0.5 D), corresponds to the needed enlargement. Target width can be determined by a current digital object, like a smartphone, a tablet, a keybord, or a A4 page . . .

This enlargement may be achieved by 2 ways:

Reducing the cylinder, on each side of the near vision point, of the initial surface data, by adding a weighted modified surface data that will mainly modify the initial surface data in the near vision zone. However, reducing the cylinder does not always imply reducing residual astigmatism especially in the near vision zone where prismatic effects are high.

Reduce resulting astigmatism on gaze directions on each side of the near vision reference gaze, using a weighted modified surface data obtained by an optimization process that will mainly modify the initial surface data in the near vision zone. Advantageously, the modifying surface data affects the initial surface data. Thus, the modifying surface slightly distorts the initial surface data. In practice, here it means that the modification of the initial surface data are limited to a small part of the initial surface data, the rest being unchanged.

Thus, the method proposes to provide and combine n modifying surface data that so as to customize the optical function of the ophthalmic lens.

Each modifying surface data or a specific combination of modifying surfaces allow to add a specific optical function to the initial optical function.

The method according to the invention may be implemented:

at the lens designer side, during the optimization process of the optical lens, or at the lens manufacturer side, for example by modifying the manufacturing data.

Advantageously, the method according to the invention allows:

time saving when customizing the design, only a few modifying surface required to be optimized, flexibility of the customization and segmentation becomes a real option computation at the lab, indeed the method according to the invention allows simply adding the modifying surface to the initial surface.

For example, the inventors have developed a modifying surface data to be applied to an initial surface data of the surfaces of an ophthalmic lens, for example the front face surface, so as to broaden the near vision zone without modifying the rest of the mean sphere and cylinder distribution.

Figure 6:
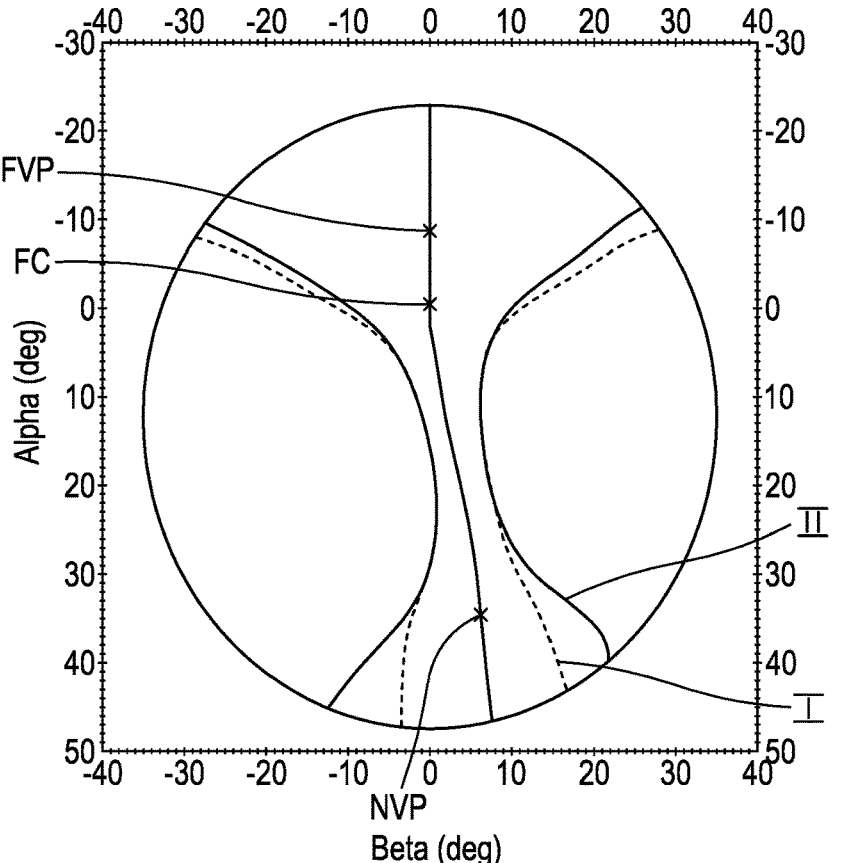
FIG. 6 illustrates an example of implementation of the method according to the present disclosure.

FIG. 6 shows an example of implementation of the present disclosure, in particular is an astigmatism map. This kind of map, astigmatism map, are well known.

FIG. 6 shows isolines of residual astigmatism cylinder of 0.5D. The dashed line I is the initial surface data. The full line II is the ophthalmic lens surface data from the modified initial surface data. FIG. 6 illustrates the enlargement of the near vision zone with an increase of field width by almost 30% in the gaze direction corresponding to the near vision reference point.

According to another embodiment, in order to propose a good compromise between the near vision access and the near vision region width, it may be possible to keep progression length depending on addition value and to customize the progression length according to the wearer relative to his preference between near vision access and the near vision region width. For instance we can propose to the wearer different progression lengths PL1 and PL2 with PL1>PL2 (Near vision access for ophthalmic lens having progression length PL2 better than for ophthalmic lens having progression length PL1) and propose to the wearer different near vision region width NVwidth1 and NVwidth2 with NVwidth1>NVwidth2 (near vision region width NVwidth1 is more comfortable than near vision region width NVwidth2). Indeed, using longer progression length allows having a larger width for the near vision region. Thus, the user will express his/her preference between the couple PI1, NVwidth1 and PL2, NVwidth2.

According to one embodiment of the present disclosure and as illustrated in FIG. 4, the initial surface data Sini may be modified in order to change at least the value on the y-axis of the near vision reference point NVP such that the distance between the value of the y-axis of the fitting cross FC and the value on the y-axis of the near vision reference point NVP corresponds to the determined progression length, and the mean sphere and the cylinder at the far vision reference point FVP of the modified initial surface data and the mean sphere and the cylinder at the near vision reference point NVP of the modified initial surface data have respectively a maximal difference of 0.05D with the mean sphere and the cylinder at the far vision reference point FVP of the initial surface data and the mean sphere and the cylinder at the near vision reference point NVP of the initial surface data.

In this case, the initial surface data is modified by taking account the determined progression length before the step of combining 47.

The present disclosure also relates to an ophthalmic lens calculating device adapted to implement a method according to the description, comprising:

an order request receiving mean adapted to receive an ophthalmic lens order request comprising at least the wearer's ophthalmic prescription, an initial surface data determining mean adapted to determine the initial surface data Sini and relative positions of an ophthalmic lens based on the order request, a modifying surface data providing mean adapted to provide at least one modifying surface data S mod$_i$ and at least one nonzero weighting coefficient alpha, calculation means adapted to combine the at least one modifying surface S mod.

The ophthalmic lens calculating device according to the present disclosure may further comprise communication means adapted to communicate with at least one distant entity to provide the modifying surface S mod and/or the corresponding weighting coefficient alpha.

According to a further aspect, the present disclosure relates to a computer program product comprising one or more stored sequences of instructions that are accessible to a processor and which, when executed by the processor, causes the processor to carry out the steps of the method according to the present description.

According to a further aspect, the present disclosure relates to an ophthalmic element intended to be worn in front of an eye of an user comprising:

the ophthalmic lens having at least a far vision region having a far vision reference point FVP, a near vision region having a near vision reference point NVP, a main meridian of progression passing through the at least far vision reference point FVP and the near vision reference point NVP, a portion on the meridian passing through the far vision region defining a vertical axis, a fitting cross FC, a prism reference point being an origin of a reference frame with a y-axis, the reference frame making it possible to define for each point on the lens a value on the y-axis relative to the vertical axis, a progression length PL corresponding to a difference between a value on the y-axis of the fitting cross FC and a value on the y-axis of the near vision reference point NVP, the ophthalmic lens having a first mean power value P1 at the far vision reference point FVP and a second mean power value P2 at the near vision reference point NVP, the ophthalmic lens comprising an addition value Add corresponding to the difference between the first mean power value P1 and the second mean power value P2, the near vision region having at the near vision reference point NVP a resulting astigmatism width, wherein the resulting astigmatism width corresponds to the higher width between a first width W1 and a second width W2, the first width W1 and the second width W2 being defined respectively as:

$$W1 = \frac{LP}{\text{Add}} \times a - b * P1 + c$$

$$W2 = d \times a\tan(e \times (\text{Add} - f)) + g$$

Where $1 < a < 2$, $0.2 < b < 0.4$, $11 < c < 12$, $3 < d < 4$, $4 < e < 6$, $1 < f < 2$ and $18 < g < 22$.

The resulting astigmatism width at the near vision reference point NVP is defined by where the resulting astigmatism value is lower than 0.5 D added to the astigmatism value at the near vision reference point NVP. The resulting astigmatism width may be expressed in degrees.

Figure 7:
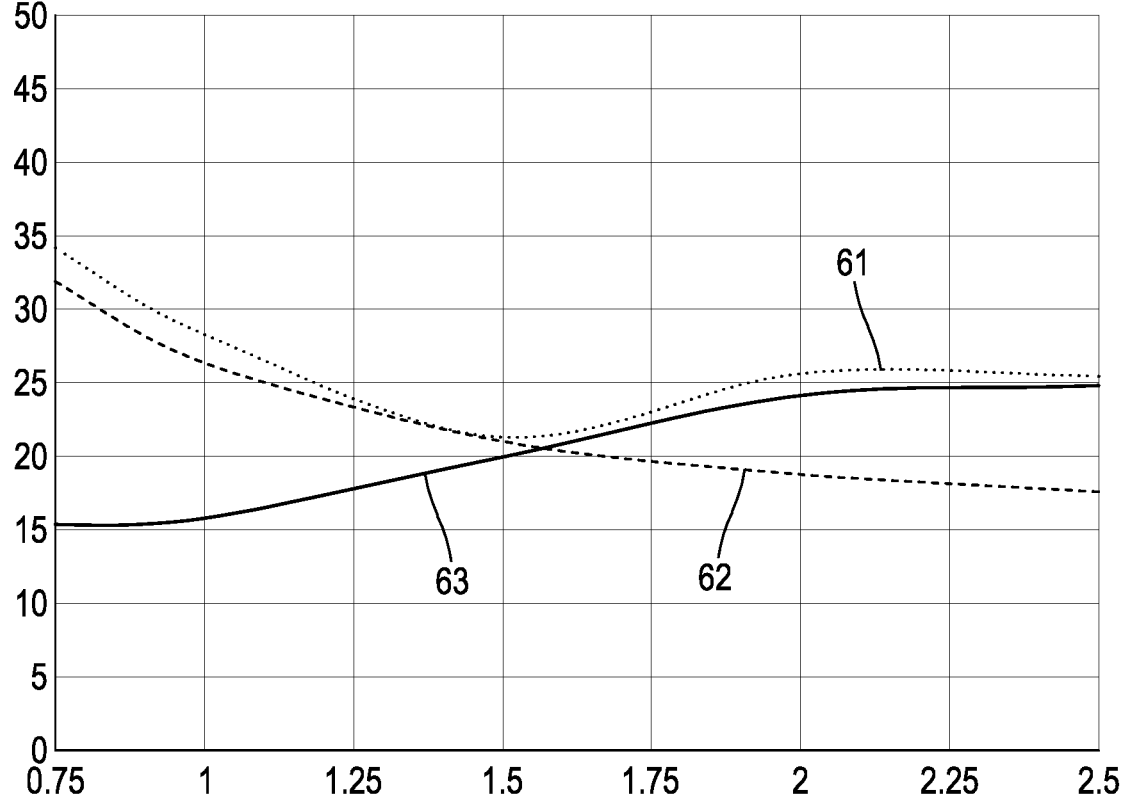
FIG. 7 is a graphical representation of the residual astigmatism width according to an embodiment of the present disclosure.

FIG. 7 is a graphical representation of the residual astigmatism width in function of the addition according to an embodiment of the present disclosure. The curve 61 is a representation of the residual astigmatism width of the ophthalmic lens according to the present disclosure, as a function of the addition. The curves 62 and 63 are a fitting of the curve 61, in particular the curve 62 fits the curve 61 before 1.5D and curve 63 is a fitting of the curve 61 after 1.5D. The curves 62 and 63 may be simulated respectively according to the equations W1 and W2.

An ophthalmic lens according to the present disclosure present the advantage to to provide a progressive lens providing high visual comfort to the wearer, in particular large near vision field of view and easy access to the near vision zone (no need to lower too much eye gaze direction so as to be close to ergonomic posture), while at the same time providing a limited level of distortions caused by the PAL design (gradient of unwanted astigmatism in particular).

Many further modifications and variations will suggest themselves to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention as defined in the set of claims.

The invention claimed is:

1. A method implemented by a computer for determining a progression length of an ophthalmic lens intended to be worn in front of an eye of an user, the method comprising:

obtaining an addition value Add;

obtaining a model, the model linking an addition value Add with a progression length; and based on the model and on the obtained addition value, determining the progression length, the progression length corresponding to a difference between a value on a y-axis of a fitting cross of the ophthalmic lens and a value on the y-axis of a near vision reference point of the ophthalmic lens.

2. The method according to claim 1, wherein the progression length is a virtual progression length of a virtual ophthalmic lens.

3. The method according to claim 2, wherein the eye is a cyclopean eye, the ophthalmic lens is a virtual ophthalmic lens, the progression length is a virtual progression length.

4. The method according to claim 1, wherein the model comprises a first sub model and a second sub model,
the first sub model linking an addition value Add with a lowering gaze angle, and
the second sub model linking a lowering gaze angle with a progression length, and wherein
the determining the progression length comprises:
based on the first sub model and on the obtained addition value, determining the lowering gaze angle, and
determining the progression length based on the second sub model and the lowering gaze angle.

5. The method according to claim 1, wherein the model is based on a prescription of the user.

6. The method according to claim 1, wherein the model is based on a statistical database.

7. The method according to claim 1, wherein the addition value is obtained from at least one of the following parameters:
a prescribed addition of the user,
a prescribed mean power of the user for near vision and a prescribed mean power of the user for far vision,
age of the user,
a prescribed mean power of the user for far vision and the age of the user.

8. A non-transitory computer-readable storage medium including one or more stored sequences of instructions that are accessible to a processor and which, when executed by the processor, causes the processor to carry out the method according to claim 1.

9. A method implemented by a computer for obtaining ophthalmic lens surface data intended to be used for manufacturing an ophthalmic lens, the method comprising:
determining a progression length of an ophthalmic lens by
obtaining an addition value Add,
obtaining a model, the model linking an addition value Add with a progression length, and
based on the model and on the obtained addition value, determining the progression length, the progression length corresponding to a difference between a value on a y-axis of a fitting cross of the ophthalmic lens and a value on the y-axis of a near vision reference point of the ophthalmic lens; and
obtaining ophthalmic lens surface data by taking into account the determined progression length.

10. The method according to claim 9,
wherein the ophthalmic lens is defined such that the ophthalmic lens has at least
a far vision region having a far vision reference point,
a near vision region having the near vision reference point,
a main meridian of progression passing through the at least far vision reference point and near vision reference point, a portion on the meridian passing through the far vision region defining a vertical axis, the fitting cross,
a prism reference point being an origin of a reference frame with the y-axis, the reference frame making it possible to define for each point on the lens a value on the y-axis relative to the vertical axis, and
the progression length corresponding to the difference between the value on the y-axis of the fitting cross and the value on the y-axis of the near vision reference point, and
wherein the obtaining ophthalmic lens surface data by taking into account the determined progression length comprises:
obtaining surface data S,
obtaining modified surface data S' by modifying the surface data S in order to change at least the value on the y-axis of the near vision reference point such that the distance between the value of the y-axis of the fitting cross and the value on the y-axis of the near vision reference point corresponds to the determined progression length, and
a mean sphere and a cylinder at the far vision reference point of the modified surface data S' and the mean sphere and the cylinder at the near vision reference point of the modified surface data S' have respectively a maximal difference of 0.05D with the mean sphere and the cylinder at the far vision reference point of the surface data S and the mean sphere and the cylinder at the near vision reference point of the surface data S, and
obtaining ophthalmic lens surface data from the modified surface data S'.

11. The method according to claim 10, wherein the obtaining surface data S comprises:
obtaining an initial surface data Sini associated with a first coordinate system, said initial surface data Sini comprising a plurality of surface points PI, each surface point PI having a mean sphere Sph(PI) and a cylinder Cyl(PI),
selecting n modifying surface data S mod$_1$ . . . S mod$_i$, . . . , S mod$_n$,
n, i being integers with n>1 and with 1<i<n
said modifying surface data S mod$_1$ . . . S mod$_i$, . . . , S mod$_n$, S mod i being associated with a second coordinate system, with n being a nonzero integer,
positioning the n modifying surface data S mod$_1$, . . . S mod$_i$, . . . , S mod$_n$, during which the relative position and/or the relative orientation of the first coordinate system with respect to the second coordinate system is determined and during which the n modifying surface data S mod expressed in the first coordinate system are S' mod 1, . . . S' mod i, . . . S' mod n, and
combining the n modifying surface data such that the surface data S is determined by:

$$S = Sini + \sum_{i=1}^{n} \text{alpha}_i \cdot S' \text{ mod}_i$$

alpha$_i$ being a nonzero weighting coefficient.

12. The method according to claim 11, wherein the n weighting coefficient alpha$_i$ are calculated based on at least one of the following parameters:
prescribed mean power,
prescribed astigmatism,
prescribed addition,
addition from age of a user.

13. The method according to claim 11, wherein the modifying surface data are selected to enlarge the near vision region and/or the far vision region.

14. The method according to claim 10, wherein the obtaining surface data S comprises:

obtaining an initial surface data Sini associated with a first coordinate system, said initial surface data Sini comprising a plurality of surface points PI, each surface point PI having a mean sphere Sph(Pl) and a cylinder Cyl(Pl), selecting n modifying surface data S $\text{mod}_1$ . . . S $\text{mod}_i$, . . . , S $\text{mod}_n$, n, i being integer with n≥1 and with 1≤i<n said modifying surface data S $\text{mod}_1$, . . . S $\text{mod}_i$, . . . S $\text{mod}_n$ being associated with the first coordinate system, with n being a nonzero integer, and combining the n modifying surface data such as the surface data S is determined by:

$$S = Sini + \sum_{i=1}^{n} \text{alpha}_i \cdot S\text{mod}_i$$

$\text{alpha}_i$ being a nonzero weighting coefficient.

15. An ophthalmic lens calculating device, comprising:

processing circuitry configured to obtain an addition value Add, obtain a model, the model linking an addition value Add with a progression length, and based on the model and on the obtained addition value, determine the progression length, the progression length corresponding to a difference between a value on a y-axis of a fitting cross of the ophthalmic lens and a value on the y-axis of a near vision reference point of the ophthalmic lens.

* * * * *